Patented July 18, 1939

2,166,877

UNITED STATES PATENT OFFICE 2,166,877

CORTICAL HORMONES

Tadeus Reichstein, Zurich, Switzerland, assignor, by mesne assignments, to Roche-Organon, Inc., Nutley, N. J., a corporation of New Jersey No Drawing. Application September 19, 1938, Serial No. 230,722. In the Netherlands September 28, 1937

3 Claims. (Cl. 260—397)

This invention relates to new hormones in a pure and crystalline state. These pure substances have the property to cure the diseases related with insufficient activity of the adrenals in animals and in humans. They are also capable to remove the phenomena of insufficiency in adrenalectomized rats, dogs and cats. So it is believed that these substances are the responsible ones for the curing activity of the active adrenal extracts.

The object of the invention is the preparation of the pure crystalline hormones. Up till now I have prepared from adrenal extracts, besides a lot of inactive compounds, three active hormones which I have called corticosterone, oxy-corticosterone and desoxy-corticosterone.

It is found that in the Everse-de Fremery test corticosterone has the rat unit in about 1 mgr., desoxy-corticosterone has almost the same activity, whereas oxy-corticosterone has the rat unit in about 1.5–2 mgr.

It has further been found that the chemical structures of the isolated substances are closely related to the sterols. By hydrogenation according to Adams-Shriner a substance identical with pregnane is obtained. The ultra violet spectrum shows the remarkable band at 240 m.$\mu$. characteristic for $\alpha$–$\beta$ unsaturated ketones. An ammoniacal silver solution is reduced very quickly in the cold, so it is very probable that the side chain has the configuration –CO–CH$_2$OH as is the case in sugars with the same property. The elementary analysis gives the stoechiometric formula for the one substance called corticosterone $C_{21}H_{30}O_4$ and for the other substance, called oxy-corticosterone $C_{21}H_{30}O_5$.

These observations have led to the following structures:

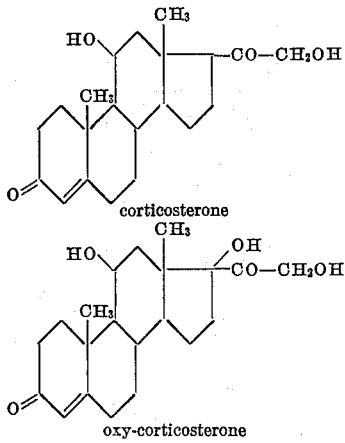

corticosterone oxy-corticosterone

The hydroxyl group in 11-position is still uncertain. The inertness of this hydroxyl group in many reactions is only known for a hydroxyl group in this position. The secondary character however is proved by its conversion into a keto group.

I prefer for the separation of the said substances to start from adrenal extracts made according to the method of Pfiffner and Swingle, but it is clear that also extracts made according to other methods may be used as starting materials. To be sure that no substance is adsorbed it is better to start from an extract in which the adrenaline has not yet been removed by the permutit. In the example a method of isolating the hormones is described more in detail.

I wish to point out here that especially by making use of my find that the hormones are oxyketones the isolation was made more easily. Thus for instance with keto reagents the ketones were separated from the extracts. From this ketonic fraction the oxy-ketones were separated by esterifying them to acylates which still possess a salt forming group. Such acylates may be extracted from their solution in a neutral organic solvent, inmiscible with water, e. g., ether, with a solution of sodium carbonate, whereas the hydroxyl free ketones are not thus extracted. After each step a fractional crystallization is inserted. With the mother liquor a further concentration is carried out. The fraction containing the oxy-ketones only is subjected to a partial crystallization from a mixture of acetone and ether, whereafter, after removal of crystals, the mother liquor is esterified and subjected to a chromatographic adsorption. As an adsorbent aluminium oxyde, fuller's earth or another substance which is known to be suitable in chromatographic analysis, may be employed. The elution with benzene and benzene-ether, ether-acetone and acetone gives several fractions, from each of which crystallized products can be obtained. It is surprising that the fraction eluted with benzene renders desoxy-corticosterone, a compound which was obtained by me for the first time by synthesis. The presence of this compound in adrenals was unknown till now. The method of synthesis of desoxy-corticosterone is dealt with in pending applications.

Example

As a starting material is used an adrenal extract made according to Pfiffner and Swingle. This extract is evaporated; 900 gr. of the residue is partitioned between pentane and 30% aqueous methanol. The aqueous layer is made weakly alkaline and extracted several times with ether to remove acids. The etherial layer is then shaken with water. Both layers are found to be active. The etherial layer contains 10 gr. solids and the aqueous layer 15 gr. Both layers are worked up separately.

*a.* The etherial layer is treated with Girard reagent to isolate the ketones. The keto fraction (3.5 gr.) is dissolved in 2 ccm. acetone whereupon ether is added till a turbidity occurs. After standing for some days 0.4 gr. crystals of corticosterone could be obtained. The mother liquor is evaporated in vacuum and the residue is saponified with potassium bicarbonate in aqueous methanol to remove any esters if present. The saponification product is freed from methanol and extracted with ether; after evaporation of the ether a residue of 2.4 gr. remains. This residue is esterified with 2.6 gr. succinic acid anhydride in 10 ccm. pyridine. After standing for 16 hours at room temperature this solution is evaporated to dryness and taken up in ether; undissolved succinic acid anhydride is removed. The etherial solution, after being washed with small quantities of diluted acid to remove rests of pyridine, is extracted with a cold solution of sodium carbonate. The succinic acid ester is precipitated with acid. In the ether remain 1.2 gr. of a hydroxyl free fraction. The succinic acid ester is saponified with potassium bicarbonate in aqueous methanol, after saponification the methanol is evaporated and the aqueous solution extracted with ether. After washing with soda solution and water the ether is driven off. There is obtained 1.2 gr. hydroxy keto fraction. This fraction is dissolved in 0.6 ccm. acetone and mixed with 5 ccm. ether. After several hours 0.3 gr. corticosterone has crystallized out. The mother liquor is evaporated in vacuum (residue 0.9 gr.) and acetylated with 2 ccm. acetanhydride in 3 ccm. pyridine. The ester (1.1 gr.) is dissolved in benzene, this solution diluted with 5 ccm. pentane and filtered through a column of aluminium oxyde. This column is then washed subsequently with benzene-pentane (1:1), with benzene, with a mixture of benzene-ether (1:1), with acetone-ether and eventually with pure acetone. The first benzenic eluate shows a crystalline remainder which is recrystallized from ether. These crystals show to be identical with the formerly synthetically prepared desoxy-corticosterone-acetate (acetoxy-21 - pregnene - 4 - dione-3,20). They show a melting point of 158° to 160° C. After saponification the pure desoxy-cortocosterone of M. P. 140° C. is obtained. No depression is found with the synthetical product.

b. The aqueous layer is concentrated and extracted several times with ether, the ether is washed with soda solution and evaporated. The residue is dissolved in methanol and treated with Girard reagent in the cold to obtain a keto fraction. The aqueous solution of the condensation products is acidified to litmus and extracted with ether (etherfraction 1). The remaining aqueous solution is then acidified to Kongo-grey and extracted again with ether (etherfraction 2). The aqueous solution is then acidified to Kongo-blue and extracted once more with ether (etherfraction 3). At last the aqueous solution is made strongly acid and extracted with ether (etherfraction 4). The etherfractions 2 and 3 are very active. 2 gr. of the etherfraction 3 are mixed with 1 gr. alcohol and allowed to stand for two to three weeks at —10° C. Crystals are formed which are filtered with suction; the precipitate is washed with a little cold alcohol. (Filtrate see under C.) The crystals (M. P. 160° to 170°) are dissolved in acetone whereupon the solvent is evaporated in vacuum. The residue is dissolved once more in acetone. By gentle evaporation (e, g., by standing for some time) thick compact brilliant needles are formed. The dry crystals show a melting point of 175° to 179° C. A subsequent crystallization supplies crystals with a melting point 180° to 182° C. These crystals are the pure hormone corticosterone.

c. The filtrate referred to above (under b) is evaporated to dryness in vacuum (residue 1.6 gr.) and thereupon dissolved in 8 ccm. absolute alcohol. Then 250 ccm. pure freshly distilled benzene is added. A resinous product precipitates. The benzenic solution is now brought into a separation funnel. The remaining resin is treated with water (about 100 ccm.) and this solution added to the benzenic solution. After this mixture has been shaken for about 5 minutes a small quantity of the resin is still found to be undissolved. The aqueous layer is removed and extracted once more with 135 ccm. benzene. The benzene layers are washed with water, the aqueous layers are now gathered and evaporated to a volume of about 10 ccm., whereupon a resinous product separates. This precipitate is now treated with benzene; a considerablee part dissolves in the benzene. The benzenic solution is dried with sodiumsulphate and evaporated to dryness in vacuum. By dissolving the residue in acetone and cautious addition of ether a crystalline precipitate is obtained. This product is oxy-corticosterone with a melting point of 207° to 210° C. (corr.) and $$(\alpha)_D^{22} = +167.2° \pm 2°$$

The compound may be recrystallized from absolute ethanol.

What I claim is:

1. The hormone called corticosterone in the pure crystalline state having the formula $C_{21}H_{30}O_4$ and having very probably the structure

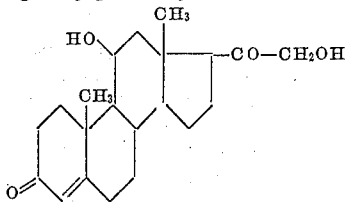

having a melting point of M. P. 180–182° C. (corr.)

$$(\alpha)_D^{15} = +223°$$

$c=1.12$ in absolute alcohol, which compound has curing properties in cases of adrenal insufficiency in animals and humans, reduces an ammoniacal silver solution in the cold and shows an absorption band in ultra violet light, typical to $\alpha$-$\beta$ unsaturated ketones.

2. The hormone called oxy-corticosterone in the pure crystalline state having the formula $C_{21}H_{30}O_5$, having very probably the structure

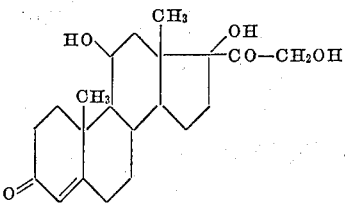

having a melting point of 207–210° C. (corr.)

$$(\alpha_2)_D^{22} = +167.2° \pm 2°$$

$c=1.029$ in absolute alcohol, which compound has curing properties in cases of adrenal insufficiency in animals and humans, reduces an ammoniacal silver solution in the cold and shows an absorption band in ultra violet light, typical to $\alpha$-$\beta$ unsaturated ketones.

3. A composition of matter, derived from active adrenal extracts consisting of oxy-ketones from such extracts.

TADEUS REICHSTEIN.